US009571357B1

(12) United States Patent
Wasserman et al.

(10) Patent No.: US 9,571,357 B1
(45) Date of Patent: *Feb. 14, 2017

(54) CLOSED LOOP COMMUNICATION

(71) Applicant: Amazon Technologies, Inc., Seattle, WA (US)

(72) Inventors: Richard Wasserman, Seattle, WA (US); Yusuf Bootwala, Issaquah, WA (US); Thomas Park, Seattle, WA (US); Aaron Eakin, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/725,759

(22) Filed: May 29, 2015

Related U.S. Application Data

(60) Continuation of application No. 13/918,235, filed on Jun. 14, 2013, now Pat. No. 9,049,102, which is a division of application No. 12/633,170, filed on Dec. 8, 2009, now Pat. No. 8,468,348.

(60) Provisional application No. 61/238,959, filed on Sep. 1, 2009.

(51) Int. Cl.
H04L 29/06 (2006.01)
H04L 12/26 (2006.01)
H04L 29/08 (2006.01)
H04L 12/58 (2006.01)

(52) U.S. Cl.
CPC ............ H04L 43/04 (2013.01); H04L 51/046 (2013.01); H04L 67/10 (2013.01)

(58) Field of Classification Search
CPC .................................................. H04L 63/0421

USPC ............................................................ 726/3
See application file for complete search history.

(56) References Cited

U.S. PATENT DOCUMENTS

| 2002/0022967 | A1 | 2/2002 | Ohkado |
| 2003/0149746 | A1* | 8/2003 | Baldwin ........... G06F 17/30861 709/219 |
| 2006/0271668 | A1 | 11/2006 | Parsons et al. |
| 2007/0061460 | A1 | 3/2007 | Khan et al. |
| 2007/0180039 | A1* | 8/2007 | Sutidze .................. G06Q 10/00 709/206 |
| 2007/0261112 | A1 | 11/2007 | Todd et al. |

OTHER PUBLICATIONS

"Anonymous Delivery of Goods in Electronic Commerce"—IBM, Hauser et al. 1996.*
U.S. Appl. No. 12/633,170, entitled "Closed Loop Communication," and filed Dec. 8, 2009.

* cited by examiner

Primary Examiner — Longbit Chai
(74) Attorney, Agent, or Firm — Thomas | Horstemeyer, LLP

(57) ABSTRACT

Disclosed are various embodiments related to intercepting, modifying, and analyzing messages being exchanged between two entities. In one embodiment, among others, a method comprises intercepting messages being exchanged between a first entity and a second entity. The intercepted messages are modified to substitute sender information identifying the sender with proxy sender information such that the sender is anonymous to the intended recipient. The messages are also analyzed to determine at least one performance metric associated with the messages being exchanged.

20 Claims, 6 Drawing Sheets

| Pair | First Party | Second Party | Proxy Information | Information |
|---|---|---|---|---|
| 303 | Alice | Bradley | "Alice" <7c286185-f86e-4f45-a@marketplace.com> ⎫ 183<br>"Bradley" <25bc371f-e0d1-4a16-9@marketplace.com> ⎫ 185 | "Alice Burdell" <alice.burdell@customerservice.com> ⎫ 184<br>"Bradley Jones" <bradley.jones@gmail.com> ⎫ 187 |
| 306 | Alice | Catherine | "Alice" <711d5fdd-e5b0-4cd1-9@marketplace.com> ⎫ 183<br>"Catherine" <f8a4f87c-28d3-4a30-b@marketplace.com> ⎫ 185 | "Alice Burdell" <alice.burdell@customerservice.com> ⎫ 184<br>"Catherine Maxwell" <catherine.maxwell@hotmail.com> ⎫ 187 |
| 308 | Catherine | Alice | "Catherine" <b41a797a-ce25-4464-8@marketplace.com> ⎫ 183<br>"Alice" <faf0b7665-c90b-43ef-8@marketplace.com> ⎫ 185 | "Catherine Maxwell" <catherine.maxwell@hotmail.com> ⎫ 184<br>"Alice Burdell" <alice.burdell@customerservice.com> ⎫ 187 |
| 309 | Bradley | Desmond | "Bradley" <899277b5-be35-47a-b@marketplace.com> ⎫ 183<br>"Desmond" <87e7ccf6-fd79-48a4-90@marketplace.com> ⎫ 185 | "Bradley Jones" <bradley.jones@gmail.com> ⎫ 184<br>"Desmond Finch" <servicerep@star.com> ⎫ 187 |

CLOSED LOOP COMMUNICATION

CROSS-REFERENCE TO RELATED APPLICATION

This is a continuation of U.S. patent application Ser. No. 13/918,235, entitled "CLOSED LOOP COMMUNICATION," and filed on Jun. 14, 2013, which is a divisional of U.S. patent application Ser. No. 12/633,170, entitled "CLOSED LOOP COMMUNICATION," and filed Dec. 8, 2009, which issued as U.S. Pat. No. 8,468,348 on Jun. 18, 2013, which claims priority to U.S. Provisional Patent Application entitled "Closed Loop Communication" filed on Sep. 1, 2009 and assigned application No. 61/238,959, all of which are incorporated herein by reference in the entirety.

BACKGROUND

Individuals sometimes communicate via the Internet and may have a discussion. After obtaining the email address of a correspondent, a person may proceed to send numerous emails to the email address of the correspondent containing advertising that the correspondent does not wish to receive. Also, the person may sell the email address of the correspondent to other people who also desire to send the correspondent additional advertising.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a table including four examples of pairs according to an embodiment of the present disclosure;

DETAILED DESCRIPTION

The following discussion describes systems and methods relating to closed loop communication management according to various embodiments. For the sake of convenience, first a data communications network 100 is described, followed by a discussion of the operation of the various components of the data communications network 100 according to various embodiments.

Figure 1:
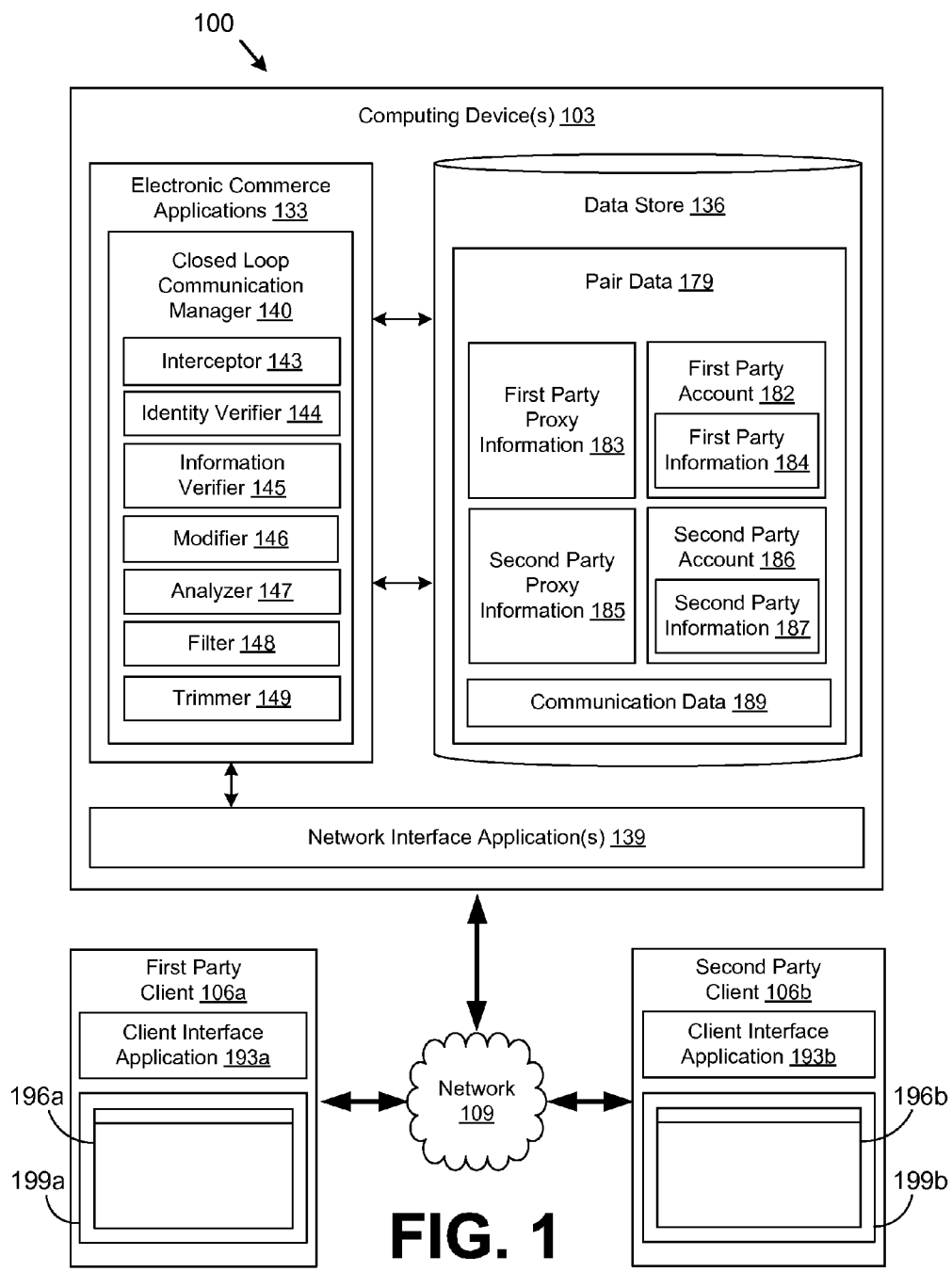
FIG. 1 is a drawing of an example of a data communications network according to an embodiment of the present disclosure.

With reference to FIG. 1, shown is an example of a data communications network 100 that includes a computing device 103 and a plurality of clients 106. Both the computing device 103 and the clients 106 are coupled to a network 109. The network 109 may comprise, for example, the Internet, intranets, extranets, wide area networks (WANs), local area networks (LANs), wired networks, wireless networks, or other suitable networks, etc., or any combination of two or more such networks.

A computing device 103 such as, for example, a server is employed to execute various applications that provide for closed loop communication management, as will be described. In other embodiments, the computing device 103 may be a desktop computer, laptop computer, mobile computing device, and/or one or more of a variety of other computing devices. To this end, the following discussion first describes the structural makeup of the various components of the data communications network 100, and then describes the operation of the same. The computing device 103 may represent servers, for example, arranged in one or more server banks or other arrangements. Such computing devices 103 may be located in a single installation or may be dispersed among many different geographical locations. For purposes of convenience, the computing device 103 is referred to herein in the singular. However, in one embodiment, the computing device 103 represents a plurality of computing devices arranged as described above.

Various applications and data are stored or executed in the computing device 103 according to various embodiments. For example, the applications executed on the computing device 103 include one or more electronic commerce applications 133 such as a closed loop communication manager 140 executed to conduct the online presence of a communication forum over a network 109 (such as the Internet or other network as can be appreciated). In addition, the closed loop communication manager 140 further includes an interceptor 143, an identity verifier 144, information verifier 145, a modifier 146, an analyzer 147, a filter 148, a trimmer 149, and/or other applications.

In addition, a network interface application 139 is executed to provide for interaction between the applications on the computing device 103 and clients 106 as will be described. To this end, the network interface application 139 may comprise, for example, a web server application, email (SMTP) server application, or similar application as can be appreciated.

The clients 106 are denoted herein as a first party client 106a and a second party client 106b. Each of the clients 106 is coupled to the network 109. Also, each of the clients 106 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability. To this end, each of the clients 106 may comprise a mobile device as can be appreciated. Each of the clients 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include display devices 199a, 199b, indicator lights, speakers, etc. Specific display devices 199a, 199b may be, for example, cathode ray tubes (CRTs), liquid crystal display (LCD) screens, gas plasma-based flat panel displays, LCD projectors, or other types of display devices, etc.

Executed within the first party client 106a and the second party client 106b are various applications including client interface applications 193, denoted as a first party client interface application 193a and a second party client interface application 193b for the first party client 106a and the second party client 106b, respectively. The first party client interface application 193a and the second party client interface application 193b are configured to interact with the network interface application 139 according to an appropriate protocol. To this end, each of the client interface applications 193a, 193b may comprise, for example, an appropriate browser application such as INTERNET EXPLORER® sold by Microsoft Corporation of Redmond, Wash., or MOZILLA FIREFOX® which is promulgated by Mozilla Corporation of Mountain View, Calif., or other type of browser application. Alternatively, the client interface applications 193a, 193b may comprise some other application, such as an email application, besides a browser application.

Where the client interface applications 193a, 193b comprise a browser application, each may communicate with the network interface application 139 on the computing device 103 via a transmission control protocol/Internet protocol (TCP/IP) or other appropriate protocol as can be appreciated. When executed in a client 106a, 106b, the respective client interface application 193a, 193b renders a respective user interface 196a, 196b on a respective display device 199a, 199b and may perform other functions. The client interface application 193 accesses network pages such as web pages or other types of content from the computing device 103 in order to access the functionality of the closed loop communication manager 140 and other components implemented in the computing device 103 as will be described.

As will be discussed in further detail below, the closed loop communication manager 140 enables anonymous communication between parties in a communication forum. To this end, the parties are associated with each other in a grouping, such as a communications pair, which is unique to the parties. Each party has an account for communicating via the communications forum, and unique proxy information is associated with the account of each party for the unique grouping. Whenever a communication from one party of the group is received, the closed loop communication manager 140 substitutes the proxy information for the actual sender information so that the recipient of the anonymous communication will not be able to determine the actual information of the sender, such as the email address of the sender.

For example, one party may send a communication, such as an email, to another party via the communication forum, and the closed loop communication manager 140 would replace the email address of the sender with a proxy email address. When the recipient replies to the email, the closed loop communication manager 140 receives the reply message at the proxy email address. The closed loop communication manager 140 replaces, in the communication, the email address of the party who replied with another proxy email address and sends the reply message to the original sender. This way, the sender is unable to determine the actual information of the recipient of the original email.

The grouping persists through multiple threads of communication and/or transactions, and each time the parties contact each other, the proxy information will replace actual information to facilitate anonymous communication. The anonymous communications may be monitored by the closed loop communication manager 140 to prevent unsolicited advertising, fraud, identity theft, or other undesirable activities. Accordingly, the anonymity may be advantageous where parties conduct transactions without face-to-face contact and are wary of giving out personal information. Further, since each communication pair is unique, the identity of a sender of a communication can be validated by comparing the actual sender to the sender expected based on the proxy email address of the intended recipient. In addition, the anonymous communications may be analyzed by the closed loop communication manager 140 to provide feedback to one or more of the parties in the group.

A party is able to access an anonymous communication using a client 106 via a network page provided by the closed loop communication manager 140 or a communication account provider (e.g., hotmail, gmail, etc.) rendered in the user interface 196 on the display device 199. In other words, a network page provided by the closed loop communication manager 140 may include all anonymous communications facilitated by the communication forum between the party and other parties. In some embodiments, a network page regarding an item may include a contact button, and the selection of the contact button may initiate an anonymous communication between at least two parties. Alternatively, the party may use a network page provided by a communication account provider to access one or more anonymous communications facilitated by the communication forum, as well as other communications unrelated to the communication forum. Additionally, in some embodiments, the party is able to access anonymous communications via a client communication application (not illustrated), which may comprise, for example, an email application such as OUTLOOK® sold by Microsoft Corporation of Redmond, Wash., or MOZILLA THUNDERBIRD® which is promulgated by Mozilla Corporation of Mountain View, Calif., or other type of client communication application.

Figure 2:
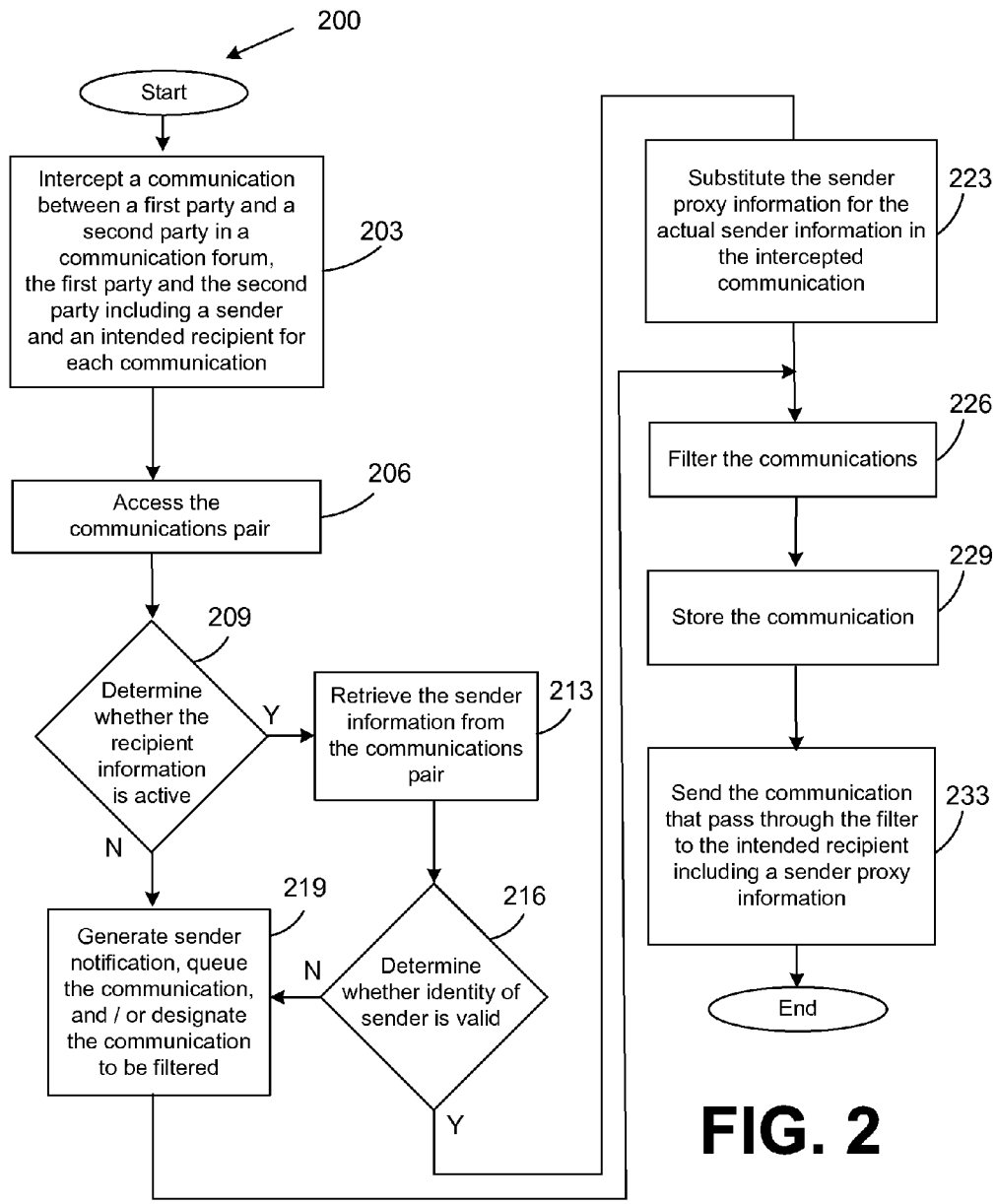
FIG. 2 is one example of a flowchart of functionality and/or steps implemented in a computing device in the data communications network of FIG. 1 in order to manage closed loop communication according to an embodiment of the present disclosure.

Referring next to FIG. 2, shown is a flowchart that provides one example of the operation of the closed loop communication manager 140 (FIG. 1) according to an embodiment of the present disclosure. Alternatively, the flowchart of FIG. 2 may be viewed as depicting steps of an example of a method implemented in the computing device 103 (FIG. 1) according to the various embodiments.

To begin, in box 203, the computing device 103 intercepts a communication in a communication forum. The communication is between at least two parties (e.g., a first party and a second party). The parties may be a buyer and a seller; a customer and a merchant; a first customer, a second customer and a third customer; a payer and a payee; a first correspondent and a second correspondent; and/or other communicators. The communication includes sender information corresponding to a sender and intended recipient information corresponding to an intended recipient. Accordingly, the first party and the second party associated with clients 106*a*, 106*b* include a sender and an intended recipient.

Also, in box 206, a computing device 103 (FIG. 1) accesses a communications pair related to the intercepted communication using the intended recipient information, which is proxy information. A communications pair is a unique association of a two party accounts with proxy information unique to each account. Pair data 179 (FIG. 1) corresponding to the communications pair is stored in a data store 136 (FIG. 1) of the computing device 103. Specifically, the pair data 179 includes a first party account 182 (FIG. 1) and a second party account 186 (FIG. 1). The first party account 182 is associated with the first party proxy information 183 (FIG. 1), and the second party account 186 is associated with the second party proxy information 185 (FIG. 1), and the proxy information is also included in the pair data 179. Additionally, the first party account 182 includes first party information 184 (FIG. 1), and the second party account 186 includes second party information 187 (FIG. 1).

Referring to FIG. 3, shown are four nonlimiting examples of information and proxy information for a plurality of pairs. A first pair 303 includes an association of Alice (the first party) and Bradley (the second party). The information and proxy information for the first pair 303 includes a first party proxy information 183 (e.g., 7c286185-f86e-4f45-a@marketplace.com) and a second party proxy information 185 (e.g., 25bc371f-e0d1-4a16-9@marketplace.com) as well as a first party information 184 (e.g., alice.burdell@customerservice.com) and a second party information 187 (e.g., bradley.jones@gmail.com). In some embodiments, the domain name for the first party proxy information 183 and the second party proxy information 185 is the same. Also, in some embodiments, the first name (e.g., Bradley) of a party is provided with the proxy information instead the full name (e.g., Bradley Jones) to add further anonymity.

As another example, a second pair 306 is shown in FIG. 3. The first party (e.g., Alice) in the second pair 306 is also the first party in the first pair 303 discussed above. Although the first party information 184 in the first pair 303 and the second pair 306 is the same, the first party proxy information 183 in the first pair 303 is different from the first party proxy information 183 in the second pair 306.

As still another example, a third pair 308 is shown in FIG. 3. In this example, the first party of the second pair 306 (Alice) is also the second party of the third pair 308. Also, the second party of the second pair 306 (Catherine) is the first party of the third pair 308. Since the first party is not the same in both the second pair 306 and the third pair 308 and since the second party is not the same in both the second pair 306 and the third pair 308, the first party proxy information 183 for the second pair 306 is different from the first party proxy information 183 for the third pair 308.

Each account may also include information for agents. For example, an account may be associated with a corporation, and the corporation may have employees. The corporation can specify that in the account, the employees that are authorized to respond to communications on behalf of the corporation. Also, each employee may have particular agent information, such as a particular email address that the employee uses when communicating on behalf of the corporation.

The information in the account for the corporation generally is referred to as primary information, and the information in the account for the agents is referred to as secondary information. A party may contact the corporation via the primary information, such as "seller@store.com." This corporation may have three customer service representatives, Adam, Bettina and Casey, who respectively each have a secondary information: "adam@store.com," "bettina@store.com," and "casey@store.com." In this example, the primary information ("seller@store.com") is a CRM or mail routing system that distributes communications amongst Adam, Bettina, and Casey.

Each of the first party information 184, the first party proxy information 183, the second party information 187, and the second party proxy information 185 is an email address, contact information, account information, or another form of information. The account information may be particularly useful when the communications for at least one of the parties are initiated and retrieved via a website using a browser application. In that case, the account information may be a username.

In box 209, an information verifier 145 of the computing device 103 determines whether the recipient information is active. When a party has engaged in fraud or other illegal acts, the proxy information of the offending party can be deemed inactive to prevent further occurrences. The fraud may include identity theft, selling counterfeit or stolen goods, accepting payment and intentionally not delivering a product, or one of a variety of other fraudulent actions. As yet another example, when a party has sent a predetermined number of advertising communications (e.g., spam), the proxy information of the offending party can be deemed inactive. Further, when a party has sent communications including viruses, worms, or other malware, the proxy information for that offending party can be deemed inactive as well. In some cases, all proxy information associated with an offending party can be deemed inactive. Moreover, all communication pairs associated with an offending party can be destroyed instead.

In box 213, when the intended recipient information is determined to be active, the computing device 103 retrieves the sender information from the communication pair. Since the communications pair was accessed based on the proxy information for the intended recipient in box 206, the sender information of the account associated with the communications pair is retrieved.

In box 216, the identity verifier 144 of the computing device 103 determines whether the identity of the sender of the communication is valid. In some embodiments, the actual sender information from the communication and sender information included the account corresponding to the communications pair are compared. If the actual sender information and the sender information are the same, then the identity of the sender is considered valid. In other words, the uniqueness of the communications pairs enables an expected sender to be compared to an actual sender.

In embodiments where the account includes primary information and secondary information, the secondary information is also compared to the actual sender information to validate the identity of the sender. Continuing the example discussed above, "seller@store.com," "adam@store.com," "bettina@store.com," and "casey@store.com" would each be compared to the actual sender information.

In embodiments where the sender logs into a website using a username and password to send communications via the communications forum, the identity of the sender with respect to the intercepted communication is considered valid due the earlier authentication of the sender during the login process. Accordingly, a determination that the sender information is account information (e.g., a username) is sufficient to determine that the identity of the sender is valid.

In box 219, when the intended recipient information is determined to be inactive in box 209, a sender notification may be sent, the communication may be queued, and/or the communication may be designated for filtering later in the method. When the intended recipient information is deemed inactive due to fraud or other illegality, in box 416, a notification may be sent to the sender such as "The account of the intended recipient is no longer active, please contact the communications forum manager if you have an issue." Similarly, in box 219, when the identity of the sender is determined to not be valid in box 216, a sender notification may be sent, the communication may be queued, and/or the communication may be designated for filtering later in the method. In some embodiments, volume-based throttling of the communication may be employed depending on the number of communications in the queue or that have been rejected.

Figure 4A:
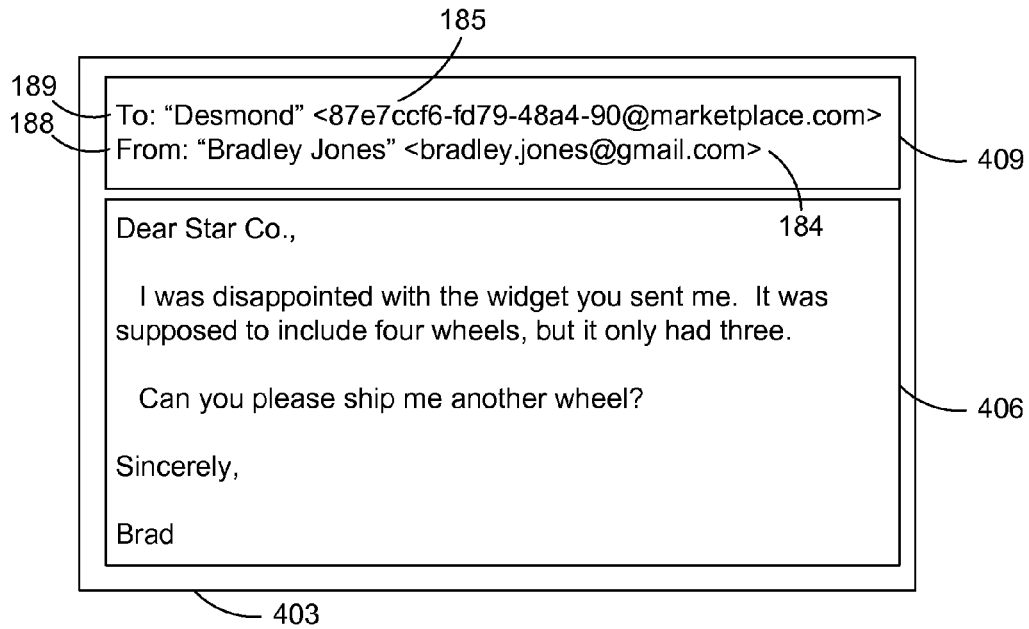
FIG. 4A is one example of a communication intercepted by the interceptor implemented in a computing device in the data communications network of FIG. 1 according to an embodiment of the present disclosure.
Figure 4B:
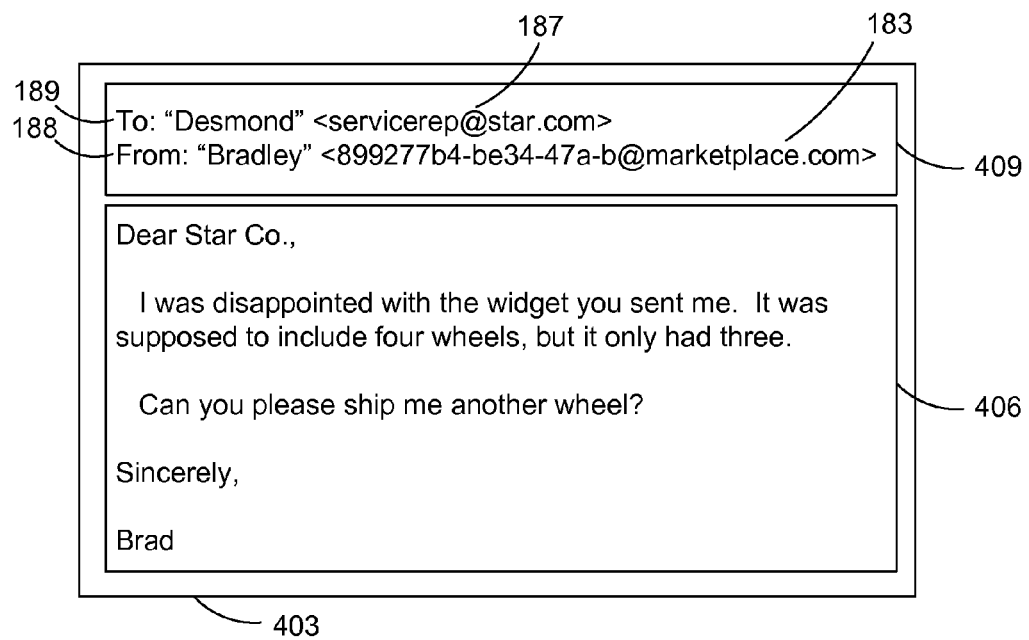
FIG. 4B is one example of a communication modified by the modifier implemented in a computing device in the data communications network of FIG. 1 according to an embodiment of the present disclosure.

In box 223, when the identity of the sender is determined to be valid, sender proxy information is substituted for the sender information in the intercepted communication. Accordingly, the intercepted communication is rendered anonymous. To this end, FIGS. 4A and 4B, which illustrate a nonlimiting example of an intercepted communication 403 and an intercepted communication 403 that has been rendered anonymous, will be discussed. The example of intercepted communications 403 illustrated in FIGS. 4A, 4B corresponds to the fourth pair 309 illustrated in FIG. 3. Referring to FIG. 4A, the intercepted communication 403 includes a message 406 and a header 409. The header 409 includes intended recipient information 189 and sender information 188. As illustrated in FIG. 4B, after the intercepted communication 403 has been rendered anonymous, the sender information 188 is replaced with first party proxy information 183 because the sender information 188 included the first party information 184 in the intercepted communication 403.

Returning to FIG. 2, in box 226, the communications rendered anonymous (by substituting the sender proxy information for the actual sender information in the intercepted communication) in box 223 are filtered. Also, communications designated to be filtered in box 219 do not pass the filter in box 226 and, hence, are not delivered to the intended recipient. Also, with regard to filtering, the computing device 103 scans the body of the communication for potential attacks or policy violations, and content is potentially selectively replaced or discarded from the message if there is a potential attack or policy violation.

Also, when a communication includes a message that includes a URL, the communication will be processed to avoid having one party redirect another party away from the communication forum. The communication itself may be filtered. Alternatively, the URL or rendered link will not be displayed when communications that are rendered on a website of the communications forum. This filtering preserves the anonymity of the communications. Further, by filtering communications, the communication forum provider is able to improve the trust of the parties who use the communication forum.

Further, in box 229, the computing device stores each of the communications as communication data 189 (FIG. 1) in a data store 136 (FIG. 1). All of the communications that are intercepted are stored regardless of the filtering except that communications including viruses, worms, or other forms of malware may not be stored. The communications are stored for a predetermined period of time (e.g., at least two years) in persistent storage. Also, the communication data 189 is stored as pair data 179 (FIG. 1) with the first party proxy information 183 (FIG. 1), the first party information 184 (FIG. 1), the second party proxy information 185 (FIG. 1), and the second party information 187 (FIG. 1). In some embodiments, metadata regarding each communication is stored as pair data 179 as well. For example, the metadata may include the date and time the communication is intercepted and/or other data regarding each of the communications.

Accordingly, the communications between a first party and a second party including discussions of various transactions are stored in the data store 136. In other words, the pair data 179 exists longer than a thread of communication, and in fact, the first party proxy information 183 and the second party proxy information 185 are reused to render communications between the first party and second party anonymous. In this way, although the communications are anonymous, a relationship is able to develop between the parties.

In box 233, the computing device 103 sends the anonymous communication, if it has passed the filter to the intended recipient. The anonymous communication includes the sender proxy information, and the communication is sent using the intended recipient information.

Figure 5:
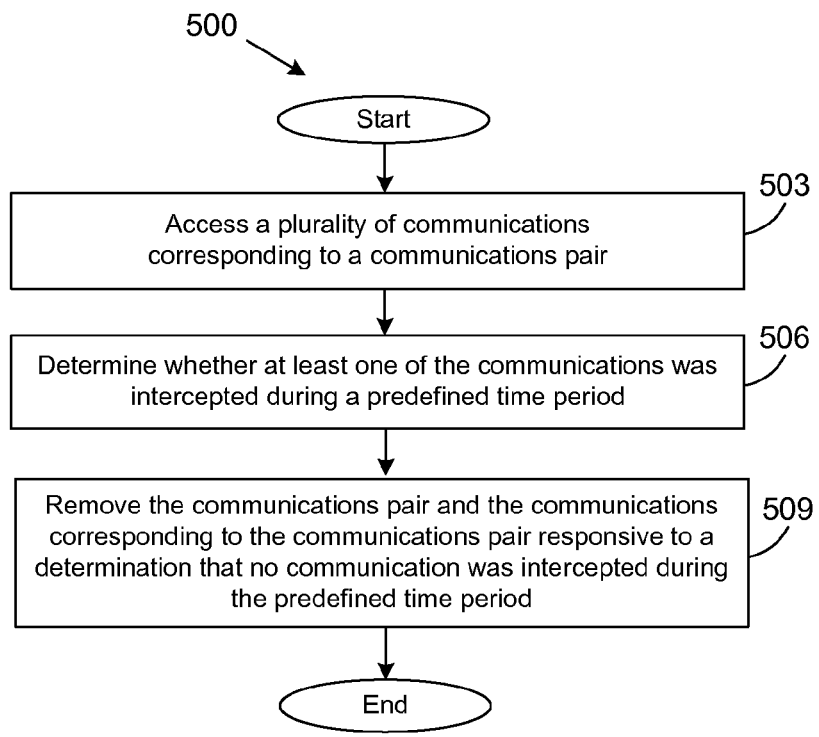
FIG. 5 is one example of a flowchart of functionality and/or steps implemented in a computing device in the data communications network of FIG. 1 in order to trim a communication according to an embodiment of the present disclosure.

Referring next to FIG. 5, shown is a flowchart that provides one example of the operation of the trimmer 149 (FIG. 1) of the closed loop communication manager 140 (FIG. 1) according to an embodiment of the present disclosure. In box 503, the computing device 103 (FIG. 1) accesses a plurality of communications corresponding to a pair. In addition, in box 506, the computing device 103 determines whether at least one of the communications was intercepted during a predefined time period. An example of a predefined time period is two years prior to the date the determination in box 506 is executed. In box 509, when the computing device 103 determines that no communication was intercepted during the predefined time period, the pair and the communications corresponding to the pair are removed. Accordingly, the pairs and the communications corresponding to the pairs that are inactive can be trimmed from the pair data 179 (FIG. 1) to reduce data storage requirements.

Figure 6:
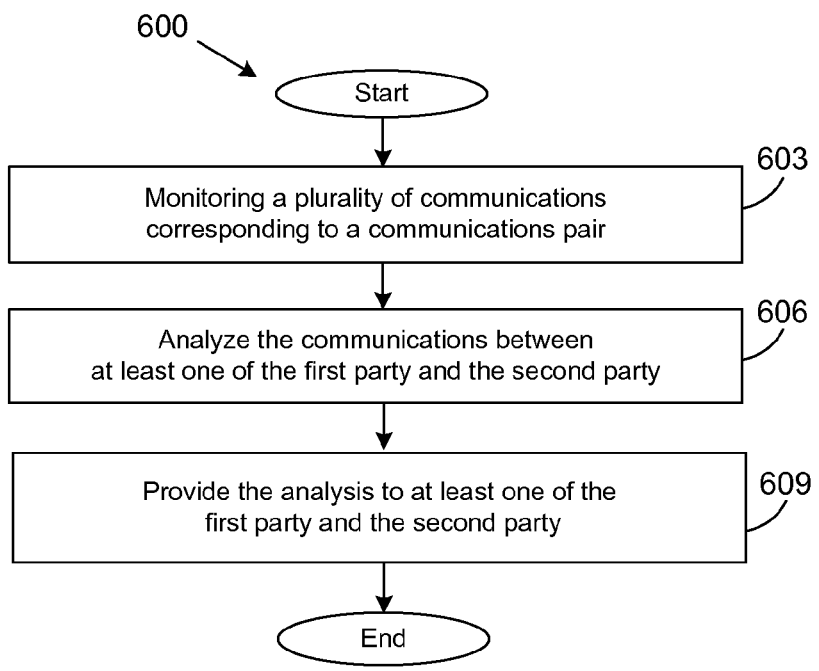
FIG. 6 is one example of a flowchart of functionality and/or steps implemented in a computing device in the data communications network of FIG. 1 in order to examine a plurality of communications according to an embodiment of the present disclosure.

Referring next to FIG. 6, shown is a flowchart that provides one example of the operation of the analyzer 147 (FIG. 1) of the closed loop communication manager 140 (FIG. 1) according to an embodiment of the present disclosure. In box 603, the computing device 103 (FIG. 1) monitors a plurality of communications corresponding to a pair. In box 606, the analyzer 147 of the computing device 103 analyzes the communications between at least one of the first party and the second party. Various metrics may include the average response times, the percentage of reported shipping errors out of all shipments, the percentage of reported defects out of all products sold, and/or a variety of other metrics.

Also, in box 609, the computing device 103 provides the analysis generated by the analyzer 147 to the at least one of the first party and the second party. In addition to providing the analysis, various suggestions for improvement may be recommended to the at least one of the first party and the second party. For example, when one of the parties is a seller, the seller may desire feedback regarding the communications between the seller and one or more buyers. In fact, the seller may be willing to purchase the analysis.

Figure 7:
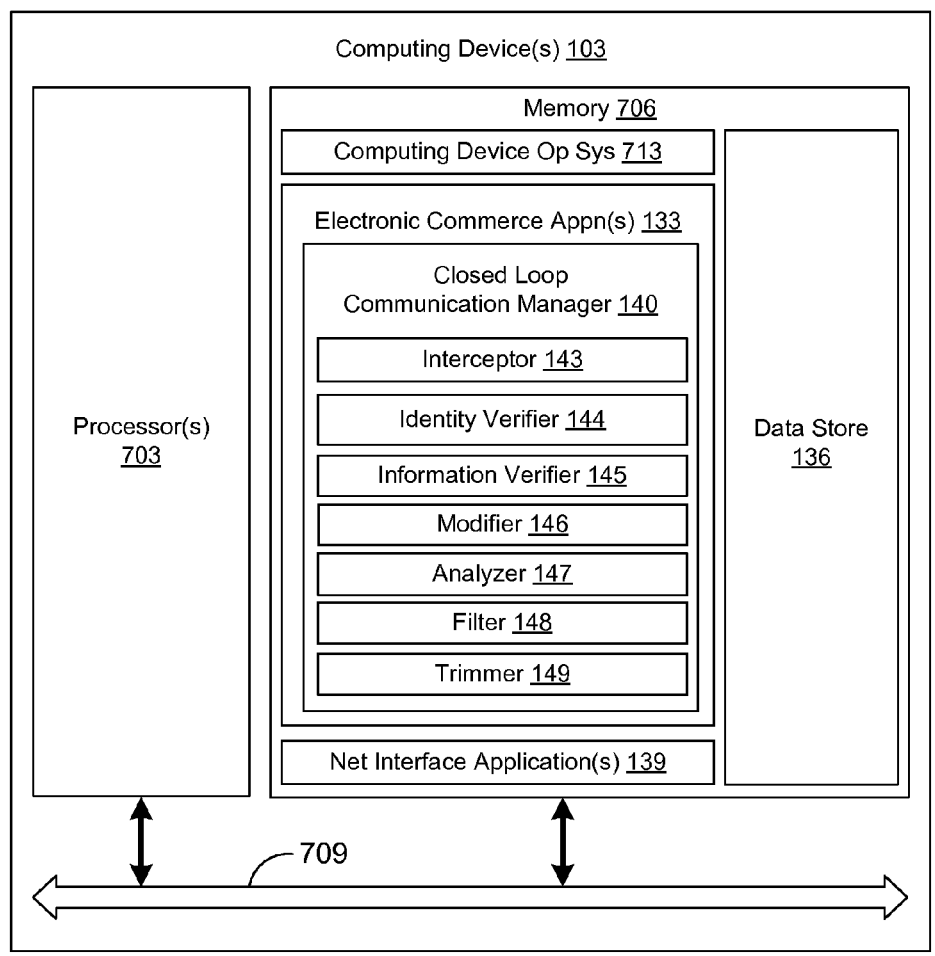
FIG. 7 is a schematic block diagram that illustrates one example of a computing device in the data communications network of FIG. 1 according to an embodiment of the present disclosure.

Referring next to FIG. 7, shown is a schematic block diagram of one example of the computing device 103 (FIG.

1) according to an embodiment of the present disclosure. The computing device 103 includes at least one processor circuit, for example, having a processor 703 and a memory 706, both of which are coupled to a local interface 709. To this end, the computing device 103 may comprise, for example, a server computer or like device. The local interface 709 may comprise, for example, a data bus with an accompanying address/control bus or other bus structure as can be appreciated.

Stored in the memory 706 are both data and several components and/or applications that are executable by the processor 703. In particular, stored in the memory 706 and executable by the processor 703 are a computing device operating system 713, the electronic commerce applications 133 (FIG. 1) (including the closed loop communication manager 140 (FIG. 1), which includes the interceptor 143 (FIG. 1), the modifier 146 (FIG. 1), the analyzer 147 (FIG. 1), the filter 148 (FIG. 1), and the trimmer 149 (FIG. 1)), the network interface application(s) 139 (FIG. 1), and potentially other applications. Also, stored in the memory 706 is the data store 136 (FIG. 1) in which the various data described above may be stored so as to be accessible to the processor 703. It is understood that there may be other applications that are stored in the memory 706 and are executable by the processor 703 as can be appreciated. Also, other data may be stored in the memory 706 and accessed by the processors 703.

A number of software components are stored in the memory 706 and are executable or executed by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 703 may represent multiple processors and the memory 706 may represent multiple memories that operate in parallel. In such a case, the local interface 709 may be an appropriate network that facilitates communication between any two of the multiple processors 703, between any processor 703 and any one of the memories 706, or between any two of the memories 706, etc. The local interface 709 may comprise additional systems designed to coordinate this communication, including, for example, performing load balancing. The processor 703 may be of electrical or of some other available construction.

The various applications described above may be implemented using any one or more of a number of programming languages such as, for example, C, C++, C#, Visual Basic, VBScript, Java, JavaScript, Perl, Ruby, Python, Flash, or other programming languages.

Although the various applications described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The block diagrams and/or flowcharts of FIGS. 1, 2, 4, and 6 show the functionality and operation of an implementation of the various applications described above. If embodied in software, each of the various boxes described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each box may represent a circuit or a number of interconnected circuits to implement the specified logical function(s).

Although the flowcharts of FIGS. 2, 4, and 6 show a specific order of execution, it is understood that the order of execution may differ from that which is depicted. For example, the order of execution of two or more boxes may be scrambled relative to the order shown. Also, two or more boxes shown in succession in FIGS. 2, 5, and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications described herein comprise software or code, each can be embodied in any computer-readable medium for use by or in connection with an instruction execution system such as, for example, a processor in a computer system or other system. In this sense, the applications may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
   intercept a plurality of messages being exchanged over a network between a first entity and a second entity, an intended recipient message address of individual ones of the plurality of messages that are intercepted being a proxy message address;
   substitute sender information included in the individual ones of the plurality of messages that are intercepted with proxy sender information;
   analyze the plurality of messages that are intercepted to determine at least one performance metric associated with the plurality of messages; and
   generate an analysis report including at least one suggestion for improvement of a response time associated with the at least one performance metric in response to analyzing the plurality of messages.

2. The non-transitory computer-readable medium of claim 1, wherein a portion of the plurality of messages intercepted are sent from the first entity to the second entity, and the sender information associated with the portion of the plurality of messages is substituted with the proxy sender information associated with the first entity.

3. The non-transitory computer-readable medium of claim 2, wherein, when executed, the program further causes the at least one computing device to at least send the portion of the plurality of messages sent from the first entity to the second entity after substituting the sender information with the proxy sender information associated with the first entity, an identity of the first entity being unknown to the second entity.

4. The non-transitory computer-readable medium of claim 2, wherein another portion of the plurality of messages intercepted are sent from the second entity to the first entity, and the sender information associated with the portion of the plurality of messages is substituted with the proxy sender information associated with the second entity.

5. The non-transitory computer-readable medium of claim 4, wherein, when executed, the program further causes the at least one computing device to at least send the portion of the plurality of messages sent from the second entity to the first entity after substituting the sender information with the proxy sender information associated with the second entity, an identity of the second entity being unknown to the first entity.

6. The non-transitory computer-readable medium of claim 1, wherein the at least one performance metric corresponds to a second party response time associated with the second entity responding to at least a portion of the plurality of messages sent by the first entity.

7. The non-transitory computer-readable medium of claim 1, wherein subject matter of at least one of the messages relates to a shipping error, and wherein the at least one performance metric is used to determine a percentage of shipping errors that are reported.

8. The non-transitory computer-readable medium of claim 1, wherein subject matter of at least one of the messages relates to a product defect, and wherein the at least one performance metric is used to determine a percentage of defects associated with products sold by the second entity that are reported.

9. The non-transitory computer-readable medium of claim 1, wherein the program further comprises sending a notification including the at least one suggestion for improvement to the second entity.

10. A system, comprising:
   at least one computing device;
   a memory accessible to the at least one computing device; and
   a communication manager executable in the at least one computing device, wherein, when executed, the communication manager causes the at least one computing device to at least:
      intercept a plurality of messages being exchanged between a plurality of entity pairs, the plurality of messages being intercepted prior to being delivered to a respective intended recipient, wherein individual entity pairs comprise a first entity and a second entity, and an intended recipient message address of individual ones of the plurality of messages being a proxy message address;
      substitute sender information included in the individual ones of the plurality of messages that are intercepted the proxy sender information;
      determine at least one performance metric associated with the plurality of messages based at least in part on an analysis of at least a portion of the plurality of messages; and
      generate an analysis report to send to the second entity of the plurality of entity pairs, the analysis report including at least one suggestion for improvement of a response time associated with the at least one performance metric.

11. The system of claim 10, wherein the second entity of a first entity pair of the plurality of entity pairs is equivalent to the second entity of a second entity pair of the plurality of entity pairs.

12. The system of claim 10, wherein the sender information is substituted with the proxy sender information such that an identity of an original sender is anonymous to the respective intended recipient.

13. The system of claim 10, wherein subject matter of the portion of the plurality of messages relates to at least product shipment, and the at least one performance metric includes a percentage of product shipments associated with a reported shipping error of products sold by the second entity.

14. The system of claim 10, wherein subject matter of the portion of the plurality of messages relates to a plurality of products sold by the second entity, and the at least one performance metric includes a percentage of products sold associated with a reported defect.

15. The system of claim 10, wherein the at least one performance metric includes an average response time of the second entity responding to a subset of the plurality of messages sent by the first entity.

16. The system of claim 10, wherein, when executed, the communication manager further causes the at least one computing device to at least determine the at least one suggestion for improvement based at least in part on the at least one performance metric.

17. A method, comprising:
    intercepting, via at least one of one or more computing devices, a plurality of messages being exchanged between a first party and a second party, an intended recipient message address of individual ones of the plurality of messages that are intercepted being a proxy message address;
    substitute sender information included in the individual ones of the plurality of messages that are intercepted with proxy sender information;
    analyzing, via at least one of the one or more computing devices, the plurality of messages to determine a performance metric associated with the plurality of messages; and
    generating, via at least one of the one or more computing devices, an analysis report based at least in part upon the performance metric, the analysis report including at least one suggestion for improvement of a response time associated with the at least one performance metric.

18. The method of claim 17, wherein the performance metric is associated with at least one of: a response time of the second party responding to a portion of the plurality of messages sent from the first party, whether subject matter of at least one of the plurality of messages relates to a shipping error of a product associated with the second party, or whether subject matter of the at least one of the plurality of messages relates to a product defect of the product associated with the second party.

19. The method of claim 17, further comprising determining, via at least one of the one or more computing devices, a suggestion for improvement based at least in part on the performance metric.

20. The method of claim 17, further comprising sending, via at least one of the one or more computing devices, the analysis report to the second party.

* * * * *